United States Patent [19]

Scott

[11] Patent Number: 4,659,258
[45] Date of Patent: Apr. 21, 1987

[54] DUAL STAGE DYNAMIC ROCK STABILIZING FIXTURE AND METHOD OF ANCHORING THE FIXTURE IN ROCK FORMATIONS

[75] Inventor: James J. Scott, Rolla, Mo.

[73] Assignee: Scott Limited Partners, Rolla, Mo.

[21] Appl. No.: 898,764

[22] Filed: Aug. 14, 1986

Related U.S. Application Data

[63] Continuation of Ser. No. 789,789, Oct. 21, 1985, abandoned.

[51] Int. Cl.$^4$ .............................................. E21D 20/02
[52] U.S. Cl. .................................... 405/261; 405/260; 411/82
[58] Field of Search .............. 405/261, 260, 206, 219, 405/220; 411/15, 57, 60, 61, 82, 411, 414

[56] References Cited

U.S. PATENT DOCUMENTS

| | | | |
|---|---|---|---|
| 1,934,560 | 11/1933 | Rawlings | 411/15 |
| 3,108,443 | 10/1963 | Schuermann et al. | 405/261 |
| 3,737,027 | 6/1973 | Ball | 405/260 |
| 4,022,101 | 5/1977 | Helgessor | 411/60 |
| 4,096,944 | 6/1978 | Simpson | 206/219 |
| 4,126,005 | 11/1978 | Coursen | 405/261 |
| 4,160,614 | 7/1979 | Koval | 405/259 |
| 4,227,612 | 10/1980 | Dillon | 206/219 |
| 4,303,354 | 12/1981 | McDowell, Jr. | 405/260 |
| 4,305,687 | 12/1981 | Parker | 405/260 |
| 4,313,697 | 2/1982 | Rozanc | 405/261 |
| 4,372,708 | 2/1983 | Bower, Jr. et al. | 405/261 |
| 4,378,180 | 3/1983 | Scott | 405/259 |
| 4,393,638 | 7/1983 | Sell et al. | 52/704 |
| 4,400,113 | 8/1983 | Chaiko et al. | 405/261 |
| 4,501,515 | 2/1985 | Scott | 405/259 |
| 4,516,883 | 5/1985 | Zeitler | 405/260 |
| 4,516,885 | 5/1985 | Calandra, Jr. | 405/261 |
| 4,516,886 | 5/1985 | Wright | 405/261 |
| 4,518,292 | 5/1985 | Calandra, Jr. | 411/82 |
| 4,534,679 | 8/1985 | White et al. | 405/261 |
| 4,534,680 | 8/1985 | White et al. | 405/261 |

FOREIGN PATENT DOCUMENTS 1525224 5/1968 France .................................. 405/261

Primary Examiner—Cornelius J. Husar
Assistant Examiner—Kristina I. Hall
Attorney, Agent, or Firm—Gravely, Lieder & Woodruff

[57] ABSTRACT

A dual stage dynamic rock stabilizing fixture for insertion in a bore hole in a geologic structure, the fixture combining a dynamic compressible plastic formable material and an activatable bonding material in various cooperating arrangements which upon insertion of an anchor rod will perform an initial stabilization of the rock structure through the compression of the formable material by the anchor rod in advance of a subsequent stabilization effect upon setting up of the activatable bonding material through mixing action of a suitable surface configuration on the anchor rod. The fixtures hereof are designed to carry out the steps of a method of inserting the combined formable material and the bonding material into a bore hole, and using an anchor rod to establish a rapid first stage of rock stabilization through the formable material which creates a dynamic support and a second stage of rock stabilization from the activatable bonding material which creates a high modulus stiff anchor.

29 Claims, 8 Drawing Figures

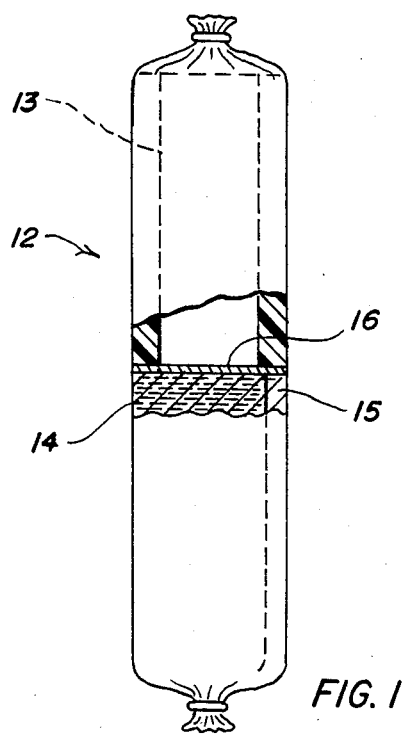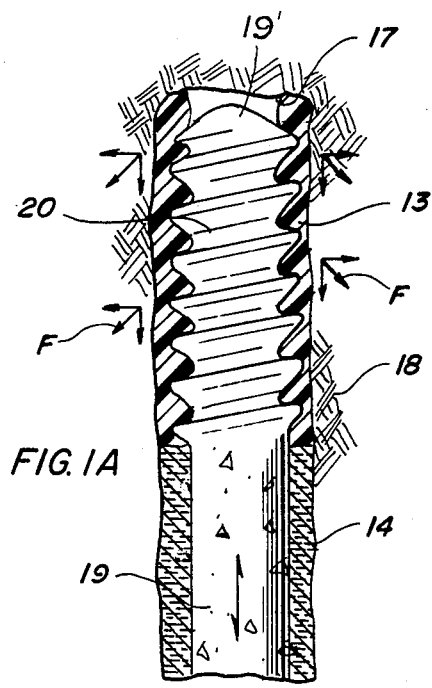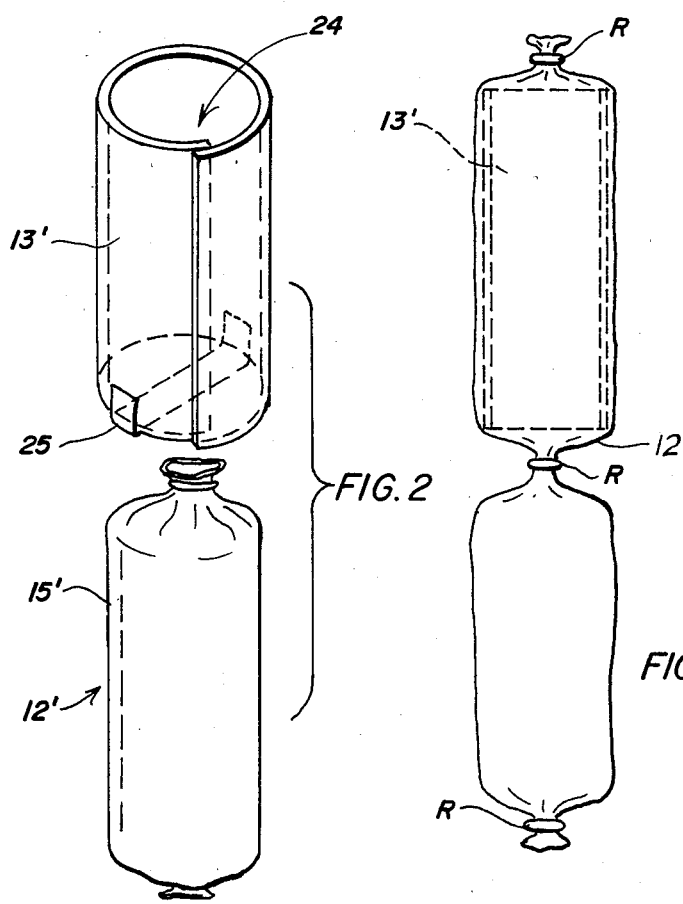

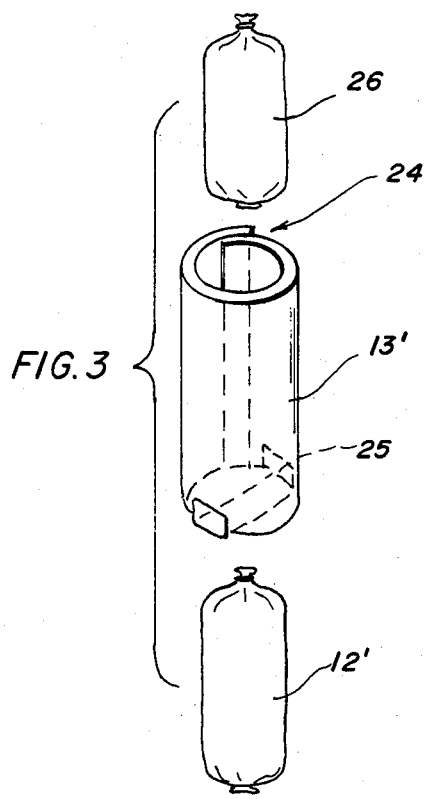
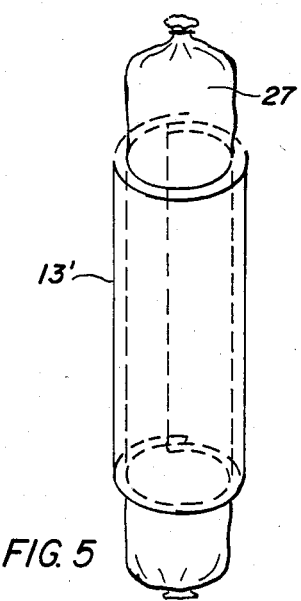
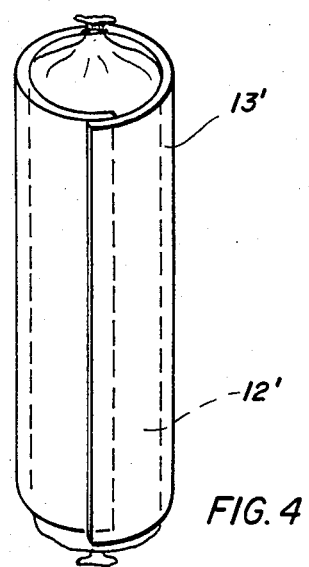
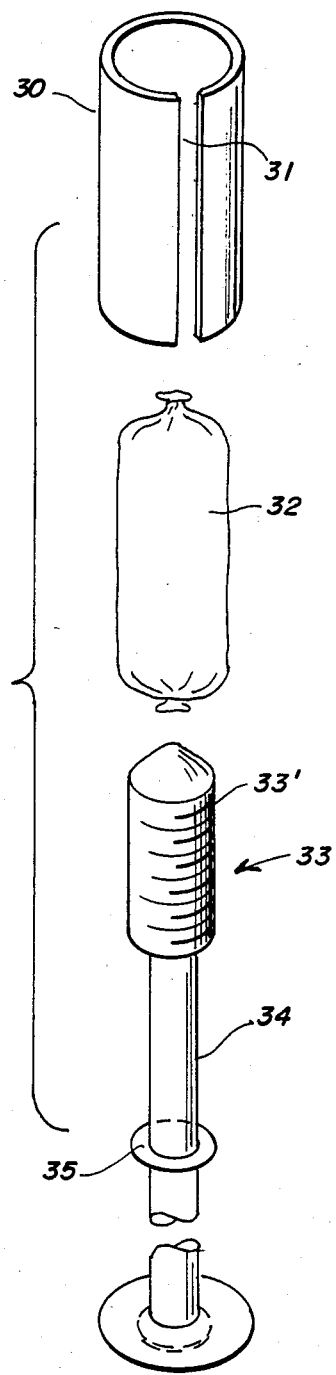

DUAL STAGE DYNAMIC ROCK STABILIZING FIXTURE AND METHOD OF ANCHORING THE FIXTURE IN ROCK FORMATIONS

This is a continuation of application Ser. No. 789,789, filed Oct. 21, 1985, now abandoned.

BACKGROUND OF THE INVENTION

1. Field of the Invention

This invention pertains to a dual stage dynamic rock anchor and a method of obtaining anchorage of the fixture in a rock formation in which the fixture combines a two stage complementary anchoring systems.

2. Description of the Prior Art

In a general understanding of rock mechanics a typical approach is to stabilize the roof as well as the walls of a passage formed in a geologic rock formation by forming a number of bore holes and insert anchor fixtures to stabilize the rock formation and reinforce the unsupported rock formations that have been exposed by a mining operation. The fixtures usually include a bolt or rod that is anchored in the bore hole so as to firmly hold it in place with a bearing plate and/or mats or mesh held against the wall surface by a head on the bolt or rod.

The fixtures used in stabilizing the rock formation may be of the mechanical character in which an expansion anchor device is driven into a bore hole to receive and secure a rod in position so that a thrust plate can be positioned in abutment with the rock formation exposed in the mine passage. A variation of the mechanical anchors employs a settable bonding agent to hold a rod in position, and from that stage, the next variation is made up of a combination of mechanical and bonding agents to anchor a rod in a bore hole. A further significant advance in the art of stabilizing rock formations has employed a tube of a formable material for anchoring a rod or bolt in a bore hole and maintaining the rod or bolt under tension through a plate held in abutment with the exposed rock formation.

Examples of mechanical anchors with or without bonding agents are found in U.S. Pat. Nos. 4,305,687, 4,378,180, 4,400,113, 4,516,883, 4,516,885, 4,516,886, 4,534,679, and 4,534,680. Examples of anchors secured by bonding agents are disclosed in U.S. Pat. Nos. 3,108,443, 4,096,944, 4,303,354, 4,313,697, and 4,393,638. Examples of rock fixtures employing a dry formable body or tube of material for anchoring a rod are U.S. Pat. No. 4,501,515 and French Pat. No. 1,525,224.

There are problems related to the retaining of rock formations in place when mining exposes the structure of a hitherto undisturbed rock formation. That rock structure is susceptible of collapsing under its own weight when the normal support has been removed. Thus, when underground galleries are dug, the surrounding geologic rock structure exerts on the walls of the galleries various pressures that eventually cause localized collapsing. The collapsing forces are opposed and stabilized by rock anchors inserted in the rock formations which create a series of interconnecting arches. Pin point anchoring is already known where mechanical expansion devices secure the ends of the rods deep in the sound rock formations spaced from the galleries. The anchoring rods with the expansion devices are complex and the work of installing such devices is time consuming. Others have in the past used combination anchorage systems of mechanical and resins in an attempt to develop more usable, more reliable anchors.

SUMMARY OF THE INVENTION

The present invention provides an improvement in dynamic rock stabilizing fixtures employed in the effective support of the roof. The improvement may be embodied in placing, in a bore hole in a rock structure, a two stage or dual anchor consisting of a body of a formable material of tubular or semi-tubular form having the characteristic of being both flowable and compressible under load, and combining that with a resin or cementitious bonding material and activator enclosed in a sausage-like package, or capsule. The components are placed in the hole adjacent to the formable material, followed by inserting the roof support anchor rod so it mixes the resin component as it is thrust and rotated through the resin or may be thrust and later rotated in the resin. When the anchor rod is rotated in the formable material substantial and rapid anchorage of the rod is obtained from the formable material. This action provides a tension in the rod when the roof or wall bearing plate at the surface of the bore hole is thrust into contact with the rock surface and held in place by the bolt head. The rotation of the rod in the formable material in combination with a suitable surface configuration, which may be a thread, produces tension in the rod and clamping of the plate to the surface of the rock. The clamping action in combination with the dynamic nature of the formable material produces an immediate stabilization of the rock mass. The resinous material has no immediate stabilizing effect, but later, as it hardens, it serves to create a permanent long term, high modulus, stiff anchor which increases the total anchorage of the rod over and above that provided by the dynamic formable anchor alone.

The characteristics of this anchor are superior to others used in the past. The dynamic formable anchor has characteristics that allow a stick-slip mechanism to occur, namely movement of the rod in relation to the bore hole wall without significant loss of anchorage. Thus, it is a more yieldable anchor. The resinous portion of the anchor is a high modulus anchor and is stiff and quite brittle. While this anchor can be loaded to high loads, it does not demonstrate the good stick-slip properties of the dynamic formable anchor. By combining the two systems together in one bore hole, if the load gets so high on the rod that the resinous portion loses bond and breaks, the dynamic portion of the anchor will still be effective even after considerable stick-slip displacement of the rod relative to the bore hole wall. Under certain geologic settings this characteristic of the anchor is most desirable, especially in materials such as shale, sandstone, mudstone, and the like.

While the prior systems do work, they are more complex than the method and apparatus to be described. In this invention, there are not as many functioning parts, the resin is thoroughly mixed by the threaded portion of the rod and rotation is always in the same direction when the dynamic rock anchor is contacted so that a quality anchor fixture is obtained in the shortest possible time with limited operator training.

An important object of the present invention is to provide a simple dual dynamic anchor fixture which is continuously responsive to changes in the rock formation and adaptive on a long term basis for stabilizing rock structure in mining operations, and to overcome objectionable problems with mechanical type anchors which require expansion devices operable by the anchor rod or bolt, or are combined with hardenable resin material that encompasses the mechanical devices and sets up so the total anchor fixture is fixed and thereby unable to yield or respond to shifts in the rock structure.

The invention is embodied in a dual stage dynamic rock stabilizer for stabilizing a rock structure from a bore hole therein wherein there is an elongated hollow or tubular body of a compressible plastic material adapted to fit into the bore hole, a body of an activatable bonding material also adapted to fit into the bore hole, and an elongated anchor rod formed with a surface configuration extending from a lead-in end for a part at least of the anchor rod length, the rod adapted to be driven into the rock structure bore hole to engage in said hollow body of plastic material and in said body of bonding material to effect anchorage of said anchor rod in the rock structure bore hole thereby stabilizing the rock structure.

The invention resides also in a method of forming a composite package of a tubular body of compressible material and an activatable body of bonding material, inserting the composite body in a rock structure bore hole, and moving an elongated anchor rod into the bore hole such that its lead-in end penetrates both of said bodies and a surface configuration on the rod secures the anchor rod in the bore hole.

BRIEF DESCRIPTION OF THE DRAWINGS

Exemplary embodiments of the present invention have been provided in the accompanying drawings, wherein:

FIG. 1 is a representation of one embodiment wherein a capsule of a suitable resin or cementitious bonding material contains the formable material which provides a dynamic anchor in advance of the setting-up of the bonding material, and retains the dynamic anchoring ability after set up of the bonding material;

FIG. 1A illustrates the capsule of FIG. 1 in its embedded condition with the anchor rod and plate in operative positions;

FIG. 2 is an alternate representation of a dynamic anchor component separate from the capsule of bonding material for placement in a bore hole in advance of the tension rod;

FIG. 2A is a variation of the representation seen in FIG. 2 wherein a flexible case is divided into one section containing a plastic body and a second section containing a bonding material, the case being closed by hog rings at the ends and between the sectioning.

FIG. 3 is a further alternate representation of a dynamic anchor to be inserted in a bore hole between a leading and trailing capsule of bonding material;

FIG. 4 is still another embodiment of the invention with a capsule disposed in a tubular dynamic anchor component;

FIG. 5 is an alternate assembly variant of that in FIG. 4; and

FIG. 6 is a further embodiment of a two stage stabilizer fixture.

DESCRIPTION OF THE PREFERRED EMBODIMENTS

A first preferred embodiment of the present invention is shown in FIGS. 1 and 1A to comprise a capsule assembly of a case 12 which encloses dynamic anchor means 13 in the form of a tubular member of formable plastic material, and a body 14 of a bondable material, along with a suitable quantity of an accelerator or catalyst 15. These two materials constitute a composite package. Generally the bondable material 14 may be a suitable resin or a cementitious material. If the bondable material is a resin it will require a catalyst 15 which accelerates the setting and hardening process. If the material is cementitious material the capsule may contain activator means in the form of a supply of water in microcapsules, or the outer case of the capsule may be a water porous material such that before insertion in the bore hole it can be activated by immersion in water. Examples of such capsules are disclosed in U.S. Pat. Nos. 4,126,005 and 4,227,612, and attention is directed to those disclosures which are incorporated herein by reference. It may be desirable to separate the sleeve 13 from the bondable material 14 in which case a frangible element 16 is used, otherwise the sleeve 13 may have the bondable material filling or partially filling the interior of the sleeve 13.

The view of FIG. 1A shows a bore hole 17 in a geologic earth or rock formation 18 which has received a capsule assembly 12 of the character described in FIG. 1. That capsule 12 is inserted so its end is adjacent the back end of the bore hole 17, and an anchor rod 19 having a suitable surface configuration of thread form 20, extending along a portion of its end, is rotated into the capsule assembly 12 by a suitable driver machine (not shown but well known in the mining industry). The threads break open the capsule assembly and initiate the activation of the contained bondable material. The anchor rod 19 breaks the frangible element 16 upon encountering the formable sleeve 13, and within penetration of a few inches into the length of the sleeve 13 anchorage of the rod has occurred. The character of the anchorage is disclosed to a large extent in U.S. Pat. No. 4,501,515. As the threaded length 20 of the anchor rod 19 from its lead-in end 19' proceeds to the full length of the sleeve 13 a bearing plate 21 engages the rock formation adjacent the bore hole entrance area 22 and through the headed drive end 23 on the rod 19 engaged on the plate 21 the rod is stressed in tension. The significance of stressing the rod in this way is that a system of vector forces F is created which penetrate into the rock formation or geologic earth formation along the rod, and a system of vector forces F' is generated by the bearing plate 21 into the formation around the bore hole entrance. Such vector force result is disclosed in U.S. Pat. No. 4,501,515.

The anchorage of the rod 19 established by the formable sleeve 13 is obtained as soon as the threaded end 20 of the rod 19 begins its engagement in the sleeve 13. The characteristic nature of the material of sleeve 13 is that it has a wall thickness greater than the annular space between the threaded end of the rod and the bore hole surface. For example, assuming a bore hole of a one inch diameter, the anchor rod may have threads with about a fifteen-sixteenth inch diameter, thus providing an annular space around the thread crests of about one thirty-second inch. Such a thread may have a thread root diameter of about three-fourths inch. The formable material for use with such a thread and bore hole size may have a wall thickness that is greater than the dimension of the annular space in order to obtain a significantly large force or thrust on the bore hole surface. Size changes may be required but generally the dimensional proportions should be maintained. In other words, the wall thickness of the formable material or sleeve 13 must be responsive to the threaded end 20 of the rod 19 and the condition of the bore hole wall so that a dynamic anchor exists. A substitute for threads may be certain roughened or uneven surfaces.

The starting unstressed character of the sleeve 13 is that of a split tube having lengthwise edges in overlapped relation to make it easy to slide the assembly into the bore hole. When the lead-in end of the threaded end 20 of the rod engages the sleeve 13 from the quantity of bonding material 14 in the capsule, it has been seen, by recovered test installations, that the overlapped edges of the tube or sleeve 13 have been forced to either move so as to become butted along most of the length of the sleeve, with some evidence of a slight spacing which is generally non-uniform. The optimum installed condition of a sleeve is to have its overlapped edges assume a near butted condition so that the circumferential surface of the bore hole 17 is engaged by the outer circumference of the sleeve 13. This is a desirable condition as the sleeve 13 establishes dynamic anchorage of the rod 19 through the ability of the sleeve material to undergo expansion and compression during the life of its installation. That ability to adapt and change its shape while in the bore hole is best described as a "stick-slip" mechanism which will not loose anchorage between the rod and the bore hole even during times of large differential displacement. On the other hand, the bondable material hardens to develop a high modulus and stiff type of anchorage, which in the long-term can occasionally break away from the bore hole during earth movements, leaving only the dynamic anchorage of the sleeve 13 to hold the rod 19. Anchors may be so designed that customizing anchors can be achieved by certain combinations, such as by designing a weak dynamic anchor with a strong activatable cementitious or resin anchor or a weak resin anchor, or a strong dynamic anchor with either a strong or weak resin anchor.

An equally important embodiment of this invention is seen in FIG. 2 where the dynamic anchoring sleeve 13' is independent of the capsule package 12'. This view shows most clearly the sleeve 13' having lengthwise edges in overlapped relation at 24, and the capsule 12' having an internal area 15' for a catalyst or accelerator intended to form a reaction film which acts as a barrier to further activity until it is broken and mixing has taken place. If a compartment is needed reference is directed to U.S. Pat. No. 4,227,612 for one such example which is incorporated herein by reference. The sleeve 13' may be prepared for insertion in the bore hole by closing its bottom end by tape means 25 so as to stop entry of the bondable material from the capsule 12' into the hollow sleeve during handling. After insertion, the threaded end 20 of the anchor rod 19 is rotated through the capsule until the tape 25 is physically broken by the lead-in end 19'(see FIG. 1A) of the rod 19. The two part combination of FIG. 2 developes the same anchoring characteristics on the rod 19 as set forth in explaining the function of the unitary package of FIG. 1 when it is worked by rotating the rod 19 as it is inserted in bore hole 17.

A variation of the embodiment of FIG. 2 is disclosed in FIG. 2A. The encapsulating case 12 is made sufficiently long so one portion can receive a suitable length of a formable plastic member 13' which may be tubular with a longitudinal split as seen in FIG. 2. The case is closed at the ends of the member 13' by hog rings R or other suitable closures that will not interfere with the insertion of an anchor rod, but will be sturdy enough to withstand handling. The other portion of the case 12 is used to contain a quantity of bondable material, such as a resin and its catalyst, or a cementitious material. The case 12 is closed by a further hog ring R. The disclosure of FIG. 2A allows for some degree of flexibility in inserting the case in a bore hole. It is a charateristic of the capsule of FIG. 2A that it may be inserted in a bore hole with either portion foremost. When the bondable material enters first, the anchor rod needs to have its threaded end sufficiently long to properly engage the member 13' and also mix the bondable material properly. It is contemplated that the package of FIG. 2A can be produced in a continuous process of inserting bonding material and plastic members in an elongated case and applying the hog rings R in a sequence such that each dual case 12 can be identified by a double hog ring where a cut can be made between each double hog ring.

The embodiment illustrated in FIG. 3 is a variation of the embodiment of FIG. 2. On occasion the anchor rod must be anchored at some distance in the rock structure from the mine passage in order to reach into stable rock or earth formations. This is accomplished by dividing the bonding material into a lead capsule 26 that can be inserted in the bore hole, followed by the dynamic sleeve 13'0 and then a trailing capsule 12' seen in FIG. 2. In this alternate, the surface configuration or threaded end of an anchor rod needs to be extended in its length to maintain theaded engagement in the sleeve 13' while penetrating into the lead capsule 26. A fixture of this type obtains the immediate anchorage provided by the formable sleeve 13' and the long term hardenable anchorage from the bondable material in the leading capsule 26 and trailing capsule 12'. This embodiment of FIG. 3 provides a plurality of stages of obtaining anchorage of a rod.

While FIG. 3 discloses a composite of two capsules 12' and 26 between a formable member 13', it is believed that the trailing capsule 12' may be eliminated. This variation must be used with an anchor rod having an elongated surface configuration to anchor in the formable member 13' and properly mix the bondable material.

FIG. 4 is another embodiment of the present invention in which the capsule 12' is positioned in the tubular formable material 13' to form a single package having the dual anchorage end results discussed above. The capsule 12' is preferably charged with a resin material and a catalyst in a separate chamber. The package is insertable in a bore hole near the back of the hole so that the insertion of the anchor rod 19 will upon thrusting rotation break the capsule and allow the resin material to flow down along the rod while the threaded end of the rod is able to establish immediate anchorage of the rod. That anchorage is eventually enhanced when the resin material sets up and forms a hardened bond between the rod and the bore hole.

FIG. 5 represents a variation of the disclosure of FIG. 4. The difference is that it combines an elongated material charged capsule 27 in the tubular formable material 13' so that a single package is the result. It is considered an advantage to assemble both components in a single package for the convenience of handling at the site and during installation in the bore holes. That advantage is present in the embodiments of FIGS. 1, 4 and 5.

In FIG. 6 there is disclosed an embodiment of the two stage anchor fixture wherein the formable sleeve 30 may be rather short and have a side gap 31 which by itself is unsatisfactory as an anchor even though it retains its dynamic characteristic. However, the split sleeve 30 serves a very useful purpose as it creates a low load anchor during the time the bonding material in the capsule 32 is being mixed and set up around the rod, thereby securing the rod and making a satisfactory anchor having an anchorage of up to 4 or 5 tons of pull. The criteria that is applied in this embodiment is one in which the capsule size and length is determined by the desired anchor length in the bore hole. It is seen that the threaded rod 33 is provided, in this instance, with a threaded length 33' that is larger in diameter than another length 34 which may be connected to length 33' W by welding or in any other suitable manner. Where the rod has a length that is smaller in diameter than another length, as seen in FIG. 6, a washer or some plugging device 35 needs to be employed to retain the resin because the annular space along the smaller diameter may be too large to be of any help in retaining the resin until it sets up. A rod like the one seen at 33 in FIG. 6 may be employed in any of the other embodiments if found suitable.

The foregoing description relates to a novel and unique dual dynamic rock stabilizing anchor fixture, the preferred forms of which are seen in FIGS. 1, 4 and 5 since each depicts a single package which combines two parts of the anchor fixture, the third part being the elongated anchor rod.

The anchor fixture is seen to include several arrangements of formable plastic material and bondable material such that those bodies of material may be selectively positioned with one of the bodies entering the bore hole first, and in that selection where the body of bondable material enters first, the anchor rod must have its surface configuration, such as threads, sufficiently long to pass through the body of formable material and enter the body of bondable material to effect mixing thereof to obtain proper setting.

What is claimed is:

1. A dual stage dynamic rock stablilizer fixture for stablilizing a rock structure from a bore hole formed therein, said dual stage fixture comprising:
    (a) an elongated anchor rod received in the bore hole for resisting movement of the rock structure from within the bore hole in which said elongated anchor rod is received, the rod having a lead-in end;
    (b) an elongated hollow body of a compressible plastic material adapted to fit in the bore hole in position to receive said anchor rod and create with said rod a substantial and immediate stabilizing effect on the rock structure;
    (c) a body of bonding material adapted to fit in the bore hole adjacent said elongated hollow body for creating with said rod a substantial permanent anchor; and
    (d) a surface configuration on said elongated anchor rod extending therealong from adjacent said lead-in end, said surface configuration effecting an anchoring engagement on and within said hollow body of compressible plastic material for creating said substantial and immediate stabilizing effect, and an engagement with said body of bonding material for increasing the total anchorage of said elongated rod in the rock structure.

2. A dual stage dynamic rock stabilizer according to claim 1 wherein:
    said elongated hollow body and said body of bonding material are encapsulated together as a single assembly.

3. A dual stage dynamic rock stabilizer according to claim 1 wherein:
    said elongated hollow body encloses said body of bonding material to form a single assembly.

4. A dual stage dynamic rock stabilizer according to claim 1 wherein:
    said body of bonding material is contained in a package having a length at least as long as said elongated hollow body.

5. A dual stage dynamic rock stabilizer according to claim 1 wherein:
    said body of bonding material is divided into capsules arranged in positions to lead and trail said hollow body, and said surface configuration on said anchor rod engages with said hollow body and each of said capsules; and
    means on said anchor rod remote from said lead-in end for retaining bonding material from said trailing capsule in the bore hole.

6. A dual stage dynamic rock stabilizer fixture for a geologic rock structure for stabilizing such structure from a bore hole formed therein, the fixture comprising in combination:
    (a) first and second stage stabilizing means including a formable material in a tubular form and a bonding material for presentment in the bore hole at the same time, said tubular formable material having a cylindrical surface presentable to the surface of the bore hole and constituting a first stage stabilizing means and said bonding material being encapsulated and constituting a second stabilizing means;
    (b) a load bearing anchor rod insertable in the bore hole, for cooperation with said first stage tubular formable material and being engaged by said bonding material constituting said second stabilizing means; and
    (c) headed means on said load bearing anchor rod in position to enable rotation of said load bearing anchor rod for initiating activation of said bonding material.

7. A dual stage rock stabilizing fixture according to claim 6 wherein said formable material and said encapsulated bonding material are arranged in tandem relationship in the bore hole.

8. A dual stage rock stabilizing fixture according to claim 6 wherein said formable material is positioned adjacent said encapsulated bonding material.

9. A dual stage rock stabiliizing fixture according to claim 6 wherein said encapsulated bonding material is positioned within said tubular form of said formable material.

10. A dual stage rock stabilizing fixture according to claim 6 wherein said encapsulated bonding material is arranged in two capsules positioned to embrace said tubular formable material.

11. A dual stage rock stabilizing fixture according to claim 6 wherein said bonding material is a combined resin and resin accelerator.

12. A dual stage rock stabilizing fixture according to claim 6 wherein said bonding material is water activated cementitious material.

13. A dual stage dynamic rock stabilizing fixture for insertion in a bore hole in geologic rock structure for stabilizing such structure, the fixture comprising:
    (a) a tubular body of formable and compressible material positionable in the bore hole together with a capsule of bonding material which on being activated sets up to a hardened body;

(b) an elongated load bearing anchor rod having along its length a surface configuration of a predetermined threaded form, said anchor rod being adapted to break said capsule of bonding material and engage in said tubular body, said threaded form activating said bonding material to initiate its setting action and engage within and compress said tubular body in the bore hole to first establish stabilization of the rock structure in advance of the subsequent hardening of said bonding material; and (c) means on said anchor rod for enabling rotation of said anchor rod to effect activation of said bonding material.

14. A dual stage rock stablizing fixture according to claim 13 wherein said bonding material is a resin and a resin accelerator.

15. A dual stage dynamic rock stabilizing fixture according to claim 13 wherein said capsule of bonding material is positioned to follow said body of formable and compressible material; and means is positioned on said anchor rod for retaining said bonding material in the bore hole.

16. A dual stage rock stabilizing fixture according to claim 13 wherein said bonding material is water activated cementitious material.

17. In a dual stage rock stabilizing fixture for insertion in a bore hole beyond the entrance to the bore hole to stabilize rock structure, the improvement which comrprises:

(a) a dynamic anchor fixture combined with a settable bonding agent for use together in the bore hole;

(b) said dynamic anchor fixture including a tubular body of a formable material, an anchor rod having a threaded leading end portion and an opposite headed end, and a bearing plate held on said anchor rod by said headed end;

(c) said bonding agent including a capsule charged with a bonding material which sets up and hardens over time when activated; and (d) said anchor rod threaded leading end portion penetrating both said tubular body of formable material and said capsule, whereby:

1. said formable tubular body is compressed between said anchor rod and the bore hole, 2. said bonding material is mixed by the threaded portion of said anchor rod and sets up in engagement with said anchor rod, and 3. said bearing plate exerts tension on said anchor rod for creating a system of thrust forces in the rock structure for stabilizing such structure.

18. A dual stage rock stablizing fixture according to claim 17 wherein said bonding material is a resin and a resin accelerator.

19. A dual stage rock stabilizing fixture according to claim 17 wherein said bonding material is water activated cementitious material.

20. A method of securing a stabilizing fixture which includes an elongated rod installed in a bore hole under tension for generating forces radiating into a rock structure surrounding the bore hole, which forces stabilize such rock structure, the method comprising the steps of:

(a) inserting in the bore hole the combination of a tubular member of formable and compressible material and a capsule of settable bonding material;

(b) utilizing the elongated rod in the bore hole so it initiates the activation of the bonding material and also engages in and compresses the tubular formable material to initially establish anchorage for the rod in the bore hole in advance of the subsequent setting up of the bonding material for effecting an additional anchorage of the elongated rod in the bore hole;

(c) positioning a bearing plate on the elongated rod for engaging the bore hole entrance; and (d) rotating the elongated rod while advancing it into the tubular member in the bore hole to bring the bearing plate into engagement at the bore hole entrance to tension the rod and employ the rod to distribute the bonding material between the bore hole surface and the surface of the elongated rod.

21. A method according to claim 20 in which the insertion of the tubular member and the capsule of bonding material is carried out with the tubular member being inserted in advance of the capsule of bonding material.

22. A method according to claim 20 in which the insertion of the tubular member and the capsule of bonding material is carried out with the capsule being inserted in advance of the tubular member.

23. A method according to claim 20 in which the elongated rod is provided with a surface configuration that is of a lesser diameter than the bore hole diameter and selecting a tubular member of formable material that is compressed against the bore hole in order to receive the surface configuration of the elongated rod.

24. A member according to claim 20 in which the tubular member of formable material is combined in the capsule adjacent the bonding material.

25. A method according to claim 20 which includes the step of sizing the tube of formable material so it presents a volume of material greater than the space between the anchor rod and the bore hole.

26. A method of securing an anchor rod in a rock structure having a bore hole for stablizing the rock structure comprising the steps of:

(a) assembling a hollow body of a formable plastic material and a body of a bonding material in adjacence;

(b) placing the assembly of the bodies in a bore hole;

(c) forming an elongated rod anchor with a lead-in end and an adjacent length having a surface configuration; and (d) moving the elongated anchor rod into the bore hole such that the lead-in end penetrates both of the bodies, and the surfaces configuration activates the bonding material and conforms the hollow body thereto for securing the anchor rod in the bore hole.

27. A method according to claim 26, wherein: assembling a hollow body and a body of bondable material in adjacence comprises uniting such bodies to form a composite package.

28. A method according to claim 26, wherein: assembling a hollow body and a body of bondable material in adjacence comprises placing the body of bondable material inside the hollow body to form a composite package.

29. A composite package for insertion in a bore hole in a geologic structure for securing a structure stabilizing anchor in the bore hole, said composite package comprising:

(a) a hollow body of a formable plastic material;

(b) a bonding material; and (c) a casing member encapsulating said hollow body and bonding material such that the hollow body and bonding material form a single composite package for insertion into a bore hole.

* * * * *

UNITED STATES PATENT AND TRADEMARK OFFICE
CERTIFICATE OF CORRECTION

PATENT NO. : 4,659,258
DATED : April 21, 1987
INVENTOR(S) : James J. Scott

It is certified that error appears in the above-identified patent and that said Letters Patent is hereby corrected as shown below:

Column 6, line 24, cancel "13'0" and substitute therefore "13'".

Column 7, line 13, before "by" cancel "W".

Column 9, line 28, cancel "comr-" and substitute therefore "com-".

Column 10, line 46, cancel "surfaces" and substitute therefore "surface".

Signed and Sealed this

Eleventh Day of August, 1987

*Attest:*

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. :   4,659,258
DATED      :   April 21, 1987
INVENTOR(S) :  James J. Scott It is certified that error appears in the above-identified patent and that said Letters Patent is hereby corrected as shown below:

On the Title Page Assignee should read

-- Scott Investment Partners, Rolla, Mo. --.

Signed and Sealed this
Thirteenth Day of October, 1987

*Attest:*

DONALD J. QUIGG

*Attesting Officer*    *Commissioner of Patents and Trademarks*